US010855430B2

(12) United States Patent
Lee et al.

(10) Patent No.: US 10,855,430 B2
(45) Date of Patent: Dec. 1, 2020

(54) METHOD FOR TRANSMITTING UPLINK CONTROL INFORMATION IN WIRELESS COMMUNICATION SYSTEM, AND DEVICE THEREFOR

(71) Applicant: LG ELECTRONICS INC., Seoul (KR)

(72) Inventors: Hyunho Lee, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 16/301,725

(22) PCT Filed: May 18, 2017

(86) PCT No.: PCT/KR2017/005145
§ 371 (c)(1),
(2) Date: Nov. 15, 2018

(87) PCT Pub. No.: WO2017/200307
PCT Pub. Date: Nov. 23, 2017

(65) Prior Publication Data
US 2019/0123881 A1 Apr. 25, 2019

Related U.S. Application Data

(60) Provisional application No. 62/337,874, filed on May 18, 2016.

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/1671* (2013.01); *H04L 1/1822* (2013.01);
(Continued)

(58) Field of Classification Search
CPC ... H04W 52/04; H04W 24/10; H04W 72/042; H04W 16/14; H04L 1/1812;
(Continued)

(56) References Cited

U.S. PATENT DOCUMENTS 9,306,720 B2 * 4/2016 Takeda .................... H04L 1/003
9,877,203 B2 * 1/2018 Yoo ........................ H04L 1/0003
2016/0037507 A1 2/2016 Baldemair et al.

FOREIGN PATENT DOCUMENTS

WO 2013162247 10/2013

OTHER PUBLICATIONS

PCT International Application No. PCT/KR2017/005145, Written Opinion of the International Searching Authority dated Aug. 22, 2017, 16 pages.
(Continued)

*Primary Examiner* — Hanh N Nguyen
(74) *Attorney, Agent, or Firm* — Lee, Hong, Degerman, Kang & Waimey

(57) ABSTRACT

According to one embodiment of the present invention, a method by which a terminal configured so as to support at least one cell of one or more transmission time interval (TTI) lengths transmits uplink control information in a wireless communication system comprises the steps of: receiving downlink control information; determining whether to transmit channel state information together with an acknowledgement/negative-acknowledgement (ACK/NACK) for a downlink data channel scheduled (or indicated) by the downlink control information, on the basis of a specific field of the received downlink control information; and transmit-
(Continued)

ting both the ACK/NACK and the channel state information according to the determining step.

12 Claims, 6 Drawing Sheets

(51) Int. Cl.
*H04L 1/16* (2006.01)
*H04L 1/18* (2006.01)
*H04W 72/04* (2009.01)
*H04L 1/00* (2006.01)

(52) U.S. Cl.
CPC .......... *H04L 1/1861* (2013.01); *H04L 1/1896* (2013.01); *H04W 72/0413* (2013.01); *H04L 1/0003* (2013.01); *H04L 1/0009* (2013.01); *H04L 1/0026* (2013.01); *H04L 1/0031* (2013.01); *H04L 1/0072* (2013.01); *H04W 72/0446* (2013.01)

(58) Field of Classification Search
CPC ..... H04L 5/0055; H04L 1/003; H04L 5/0053; H04L 1/0026; H04L 5/0035
See application file for complete search history.

(56) References Cited

OTHER PUBLICATIONS

Catt, "Corrections on Simultaneous HARQ-ACK and P-CSI in 36.213", 3GPP TSG RAN WG1 Meeting #84bis, R1-162256, Apr. 2016, 4 pages.
Huawei, et al., "DCI design for short TTI", 3GPP TSG RAN WG1 Meeting #84bis, R1-162588, Apr. 2016, 11 pages.
LG Electronics, "Discussion on PUCCH design for HARQ-ACK in shortened TTI", 3GPP TSG RAN WG1 Meeting #84bis, R1-162507, Apr. 2016, 7 pages.

* cited by examiner

METHOD FOR TRANSMITTING UPLINK CONTROL INFORMATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/005145, filed on May 18, 2017, which claims the benefit of U.S. Provisional Application No. 62/337,874, filed on May 18, 2016, the contents of which are all hereby incorporated by reference herein in their entirety.

TECHNICAL FIELD

The present invention relates to a wireless communication system, and more particularly, to a method of transmitting uplink control information in a wireless communication system and an apparatus therefor.

BACKGROUND ART

In a wireless cellular communication system, discussion on a transmission/reception method capable of reducing latency as much as possible is in progress. In particular, according to the method, data is transmitted as soon as possible within a short time period using a short TTI (transmission time interval) for a service/UE sensitive to latency and a response is transmitted within a short time period in response to the data. On the contrary, it is able to transmit/receive data using a longer TTI for a service/UE less sensitive to latency.

For a service/UE sensitive to latency, it is expected to update CQI(channel quality indicator) more frequently. The present invention proposes a method for transmitting uplink control information that enables the operations above to be performed.

DISCLOSURE OF THE INVENTION

Technical Task

The present invention proposes a method of transmitting an uplink control information in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for transmitting uplink control information for a terminal configured to support at least one cell having one more transmission time interval (TTI) lengths in a wireless communication system, the method being performed by the terminal and comprising: receiving downlink (DL) control information; determining whether to transmit channel state information together with an acknowledgement/negative acknowledgement (ACK/NACK) for a DL data channel scheduled or indicated by the DL control information, based on a specific field of the received DL control information; and transmitting the channel state information together with the ACK/NACK according to the determination.

Additionally or alternatively, the specific field may include a modulation and coding scheme (MCS) field, and when an index of the MCS field of the received DL control information is lower than an index of an MCS field of previously received DL control information, both the channel state information and the ACK/NACK are determined to be transmitted.

Additionally or alternatively, the specific field may include at least one of a resource allocation field, a modulation and coding scheme (MCS) field, a new data indicator (NDI) field, and a hybrid automatic repeat request (HARQ) process number field, and the determination of whether to transmit the channel state information together with the ACK/NACK is based on the TTI lengths in addition to the specific field.

Additionally or alternatively, when a coding rate calculated based on the specific field and the TTI lengths is less than a threshold value, both the channel state information and ACK/NACK may be determined to be transmitted.

Additionally or alternatively, the threshold value may be independently configured for each index of the MCS field, each of the TTI lengths, or each TTI length group.

Additionally or alternatively, a physical uplink control channel (PUCCH) on which the channel state information and the ACK/NACK are to be transmitted together may be indicated by a second field of the received DL control information.

Additionally or alternatively, a physical uplink control channel (PUCCH) on which the channel state information and the ACK/NACK are to be transmitted together may be indicated by a value obtained by adding a predefined offset to a value of a third field of the received DL control information.

Additionally or alternatively, a physical uplink control channel (PUCCH) on which the channel state information and the ACK/NACK are to be transmitted together may be determined as one of a plurality of PUCCH resources configured through higher layer signaling.

Additionally or alternatively, the channel state information to be transmitted together with the ACK/NACK may be determined based on a channel state information reporting mode configured for the terminal or a type of the received DL control information.

Additionally or alternatively, the channel state information to be transmitted together with the ACK/NACK may be determined as an offset value for other channel state information.

Additionally or alternatively, when the received DL control information schedules DL data channels in a plurality of TTIs, channel state information to be transmitted together with an ACK/NACK for a first DL data channel or a predetermined DL data channel of the DL data channels includes channel state information of a relatively high priority, and channel state information to be transmitted together with an ACK/NACK for DL data channels, other than the first DL data channel or the predetermined DL data channel of the DL data channels, includes channel state information of a relatively low priority.

Additionally or alternatively, the channel state information to be transmitted together with the ACK/NACK for DL data channels, other than the first DL data channel or the predetermined DL data channel of the DL data channels may be determined as an offset value for the channel state information to be transmitted together with the ACK/NACK for the first DL data channel or the predetermined DL data channel of the DL data channels.

To further achieve these and other advantages and in accordance with the purpose of the present invention, according to a different embodiment, a terminal configured to support at least one cell having one more transmission time interval (TTI) lengths in a wireless communication system, the UE comprising: a transmitted and a receiver; and a processor that controls the transmitter and the receiver, wherein the processor may receive downlink (DL) control information, determine whether to transmit channel state information together with an acknowledgement/negative acknowledgement (ACK/NACK) for a DL data channel scheduled or indicated by the DL control information, based on a specific field of the received DL control information, and transmit the channel state information together with the ACK/NACK according to the determination.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently perform transmitting or receiving uplink control information in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
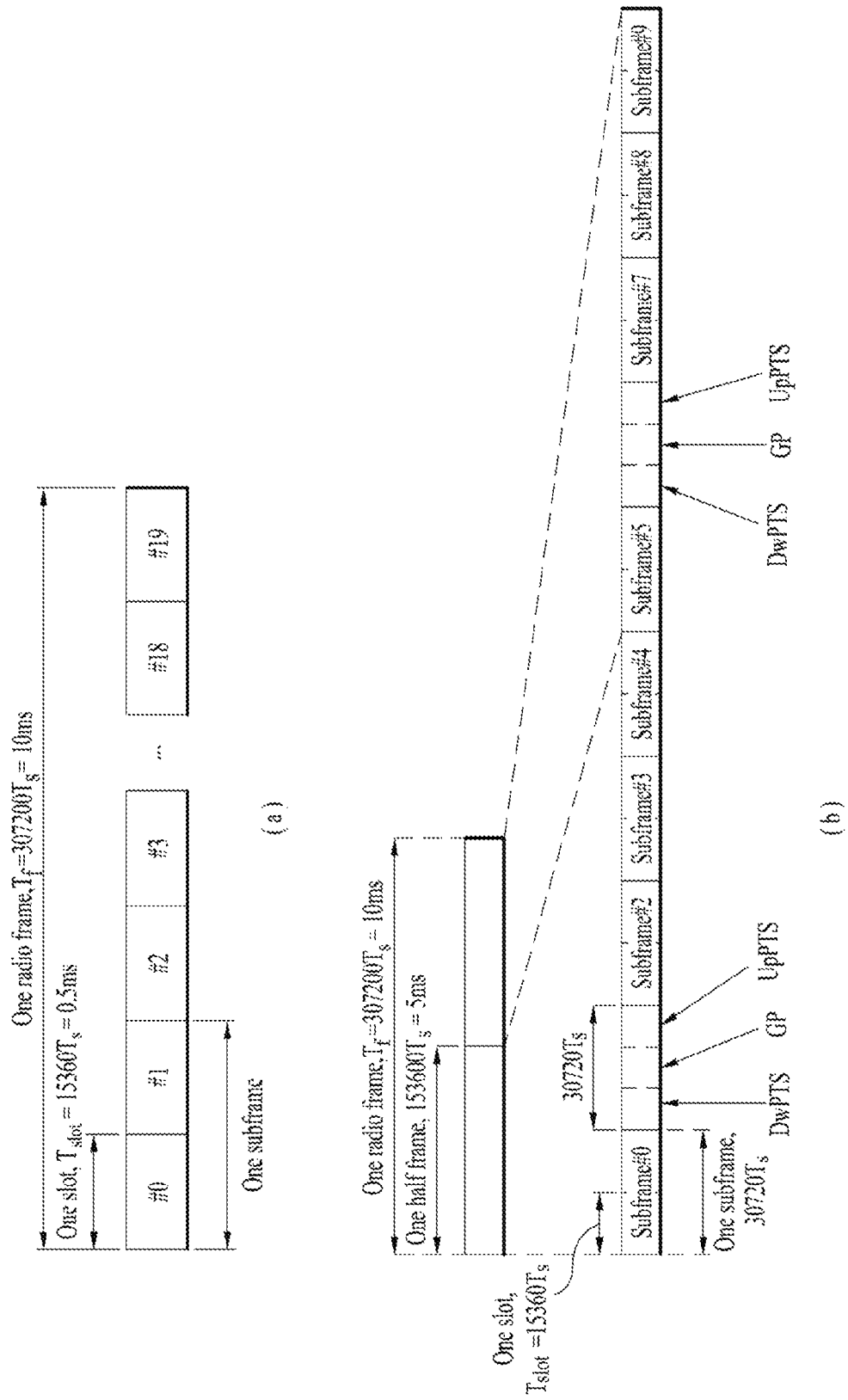
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
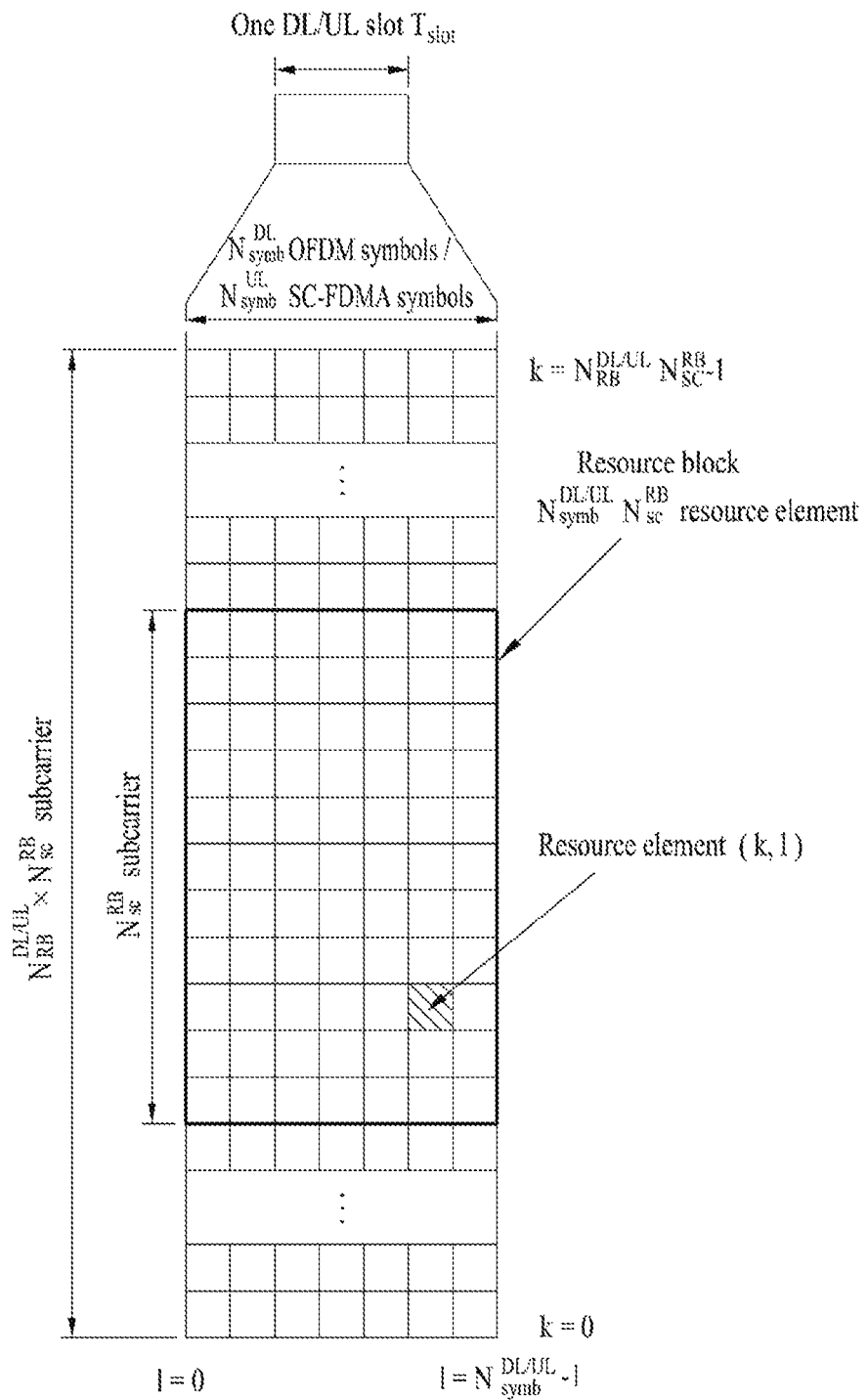
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
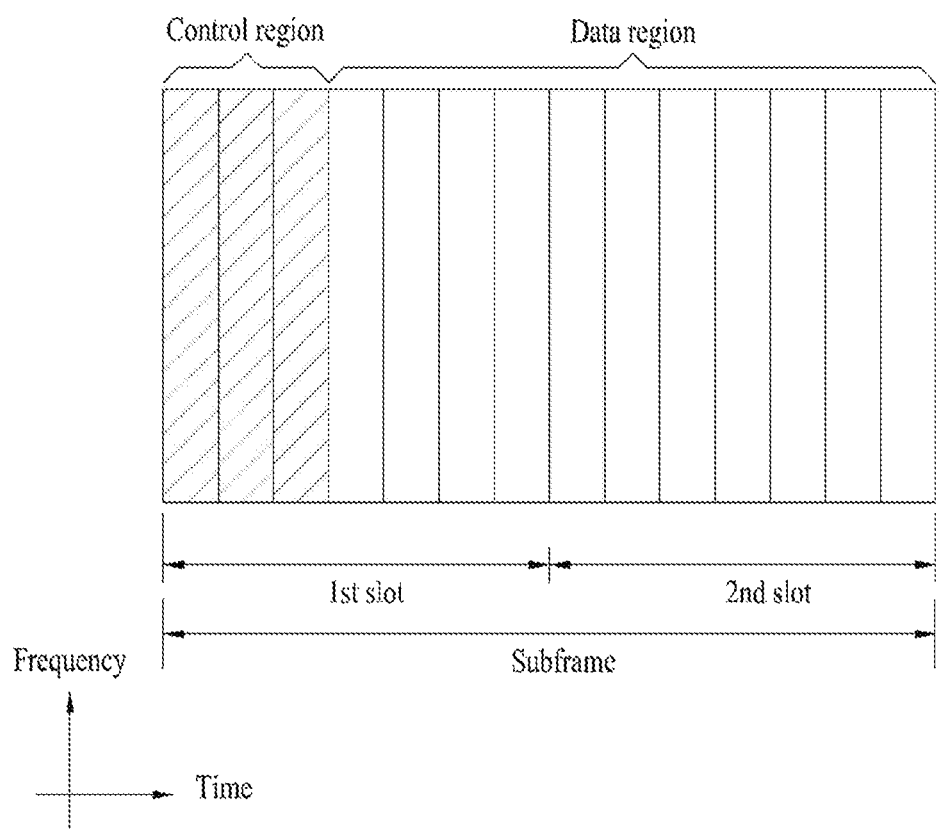
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | Number of |
|---|---|---|---|
| Type | Aggregation Level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc.

is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
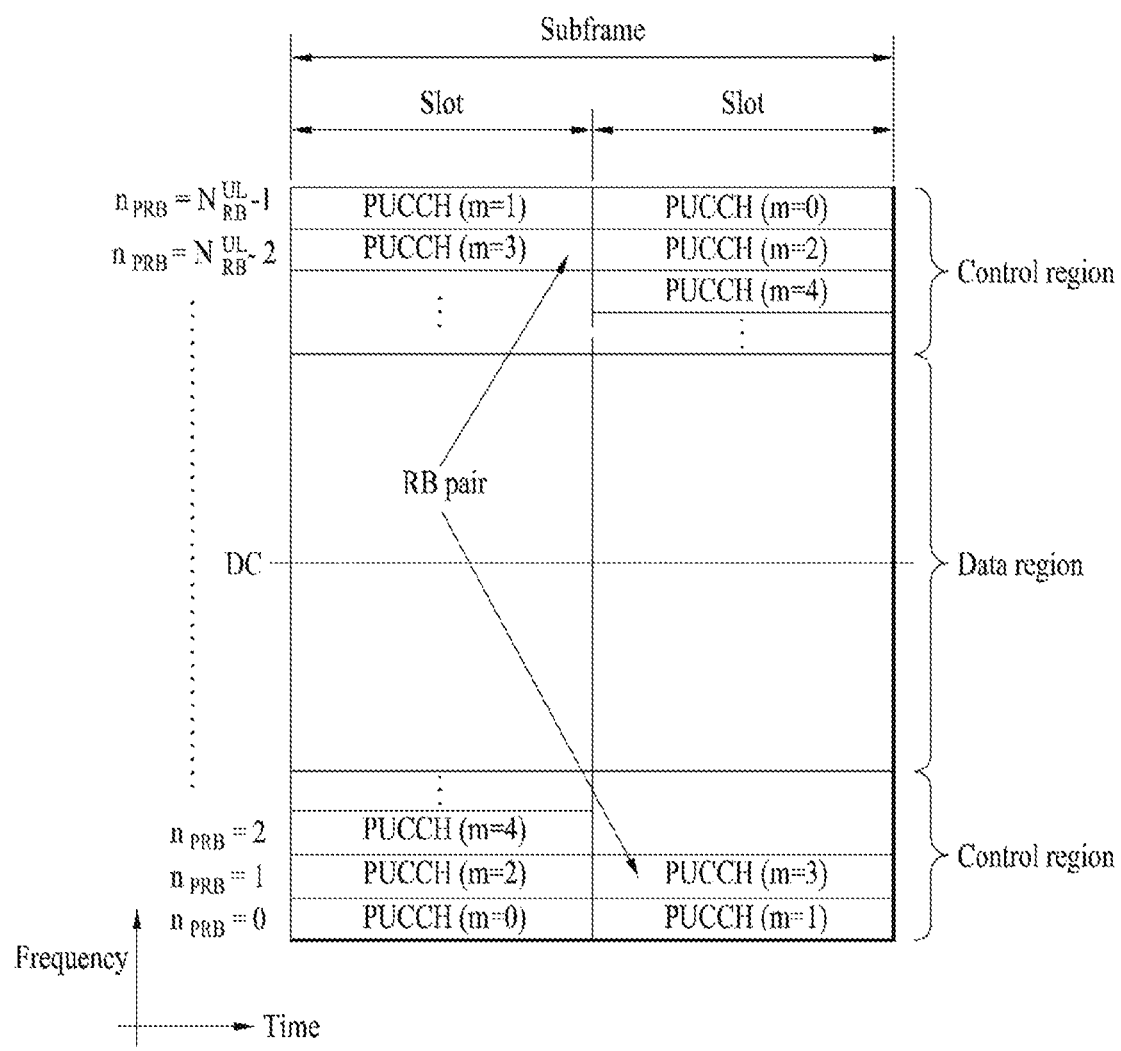
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

The present invention relates to a method of providing a plurality of different services in a system by applying a different service parameter according to a service or a UE to satisfy a requirement of each of a plurality of the services. In particular, the present invention relates to a method of reducing latency as much as possible by transmitting data as soon as possible during a short time period using a short TTI (transmission time interval) for a service/UE sensitive to latency and transmitting a response within short time in response to the data. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI. The present invention proposes a method of transmitting control information and a data signal for enabling the abovementioned operation and a multiplexing method.

For clarity, 1 ms currently used in LTE/LTE-A system is assumed as a basic TTI. A basic system is also based on LTE/LTE-A system. When a different service/UE is provided in a base station of LTE/LTE-A system based on a TTI of 1 ms (i.e., a subframe length), a method of transmitting a data/control channel having a TTI unit shorter than 1 ms is proposed for a service/UE sensitive to latency. In the following, a TTI of 1 ms is referred to as a normal TTI, a TTI of a unit smaller than 1 ms (e.g., 0.5 ms) is referred to as a short TTI, and a TTI of a unit longer than 1 ms (e.g., 2 ms) is referred to as a long TTI.

And, a short TTI can also be represented by the number of symbols. As mentioned in the foregoing description, in LTE/LTE-A system, one slot corresponds to 0.5 ms. In case of using a normal CP, one slot includes 7 symbols. In particular, in case of using a normal CP, a short TTI can include symbols less than 7 symbols. For example, it may be able to configure a short TTI of 2 symbols, a short TTI of 4 symbols, and the like.

Figure 5:
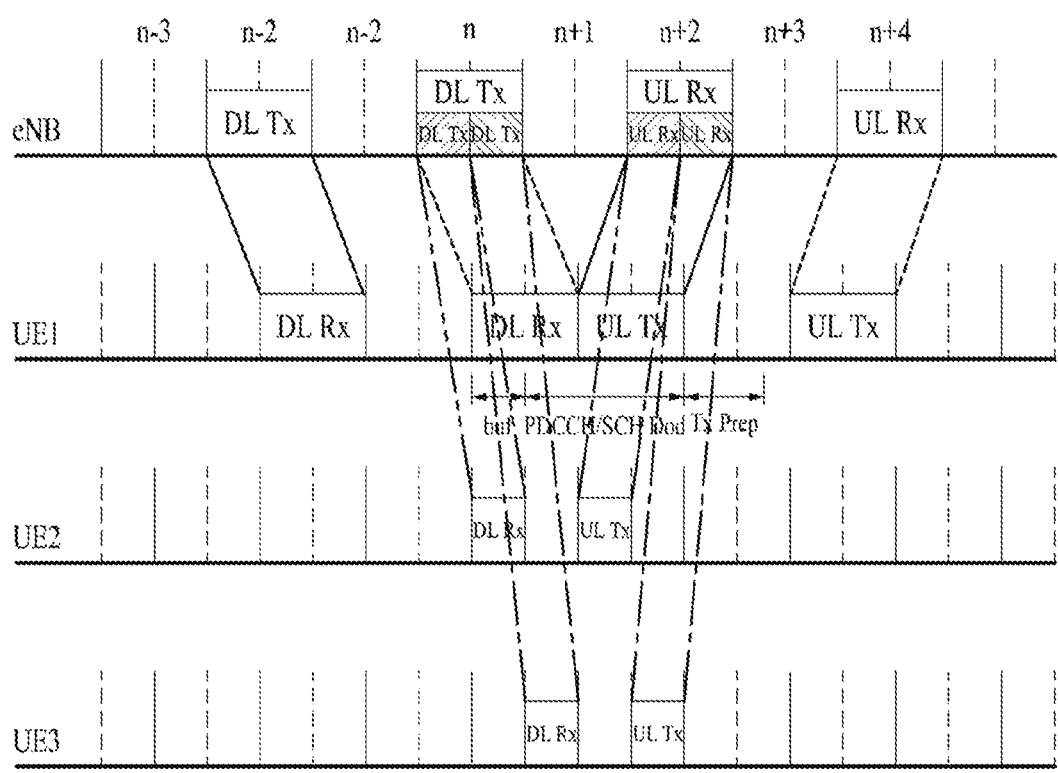
FIG. 5 illustrates DL reception timing and UL transmission timing of user equipments (UEs) operating with a different TTI (transmission time interval)

First of all, a method of supporting a short TTI of a unit shorter than 1 ms in a system basically using a normal TTI of 1 ms unit used in legacy LTE/LTE-A system is described. First of all, downlink (DL) is explained. Multiplexing between channels having a different TTI size in an eNB and an example of uplink (UL) transmission for the multiplexing are shown in FIG. 5. As a TTI is getting shorter, time taken for a UE to buffer and decode a control channel and a data channel is getting shorter. Time taken for performing UL transmission in response to the control channel and the data channel is getting shorter. As shown in the example of FIG. 5, in case of transmission of 1 ms TTI, when a DL channel is transmitted in a specific $n^{th}$ subframe, an eNB can receive a response in an $(n+4)^{th}$ subframe in response to the DL channel. In case of transmission of 0.5 TTI, when a DL channel is transmitted in a specific $n^{th}$ subframe, an eNB can receive a response in an $(n+2)^{th}$ subframe in response to the DL channel. In particular, in order to support TTIs of a different length, it is necessary to support backward compatibility to prevent an impact on a UE operating in a legacy system only for DL and UL multiplexing of channels having a different TTI.

In a next generation system, it may consider a situation that a TTI is variously set to all physical channels or a specific physical channel to satisfy requirements in various application fields. More specifically, in case of 3GPP LTE system, it may be able to configure a TTI corresponding to a unit applied to transmission of a physical channel such as PDSCH/PUSCH/PUCCH to be shorter than 1 msec to reduce latency when communication is performed between an eNB and a UE according to a scenario. And, when a plurality of physical channels exist within a single subframe (e.g., 1 msec) for a single UE or multiple UEs, a TTI can be differently applied to each of a plurality of the physical channels. In the following description of the present invention, for clarity, LTE (LTE-A) system is explained as an example. However, it is apparent that the present invention is applied not only to the LTE (LTE-A) system but also to a communication system to be developed in the future. In this case, a TTI may correspond to 1 msec (i.e., normal TTI) as a normal subframe size in LTE system. A short TTI (i.e., sTTI) corresponds to a value smaller than 1 msec. The sTTI may correspond to a single/multiple OFDM or SC-FDMA symbol unit, by which the present invention may be non-limited. And, a UL data channel and a UL control channel transmitted within the sTTI are referred to as an sPUSCH and an sPUCCH, respectively.

The present invention proposes a method for a terminal to perform UL transmission when a different TTI length is configured among a plurality of channels (i.e., between PUCCH and PUSCH) in a situation that one or a plurality of TTI lengths (e.g., a TTI length shorter than 1 ms) different from 1 ms TTI of a legacy LTE/LTE-A system are supported. The present invention can also be applied to a UL transmission method of a UE when a different TTI length is configured between cells. Or, it may apply a similar concept to multiplexing between TTI lengths that vary when a system supports one or more subcarrier spacing. For example, when a system supports subcarrier spacing X and subcarrier spacing 2*X, it may be able to apply a concept similar to a case of dividing a subframe into two sTTIs.

For clarity, the present invention is explained based on LTE. However, the contents of the present invention can be applied to a technology using a different waveform/frame structure such as new RAT, and the like.

Joint Feedback of HARQ-ACK and CSI

For latency reduction, how fast CQI update is possible may be an important factor in system performance decision. In other words, faster CQI update will allow faster rate adaptation, which can improve system performance. Therefore, a periodic CSI feedback or a request-based aperiodic CSI feedback may be possible through short TTI. Preferably, a feedback of only the CQI information may be considered to minimize the influence on the control overhead of the UL channel rather than feedback of all the CSI information. As one approach, a scheme of transmitting CSI together with a HARQ-ACK feedback for the DL data channel may be considered. Alternatively, rules can be defined to transmit CSI feedback (by piggybacking) together with uplink transmissions when the uplink transmissions are performed via the RACH procedure (for example, when transmitting A/N for msg 4). Or, rules can be defined to transmit CSI feedback (by piggybacking) together with an SR transmission._This implies that a multiplexing of a payload or a physical channel can be supported if the SR is fedback in the form of a PUSCH (BSR; buffer state report), or SR+CSI can be supported if the SR is fedback in the form of a PUCCH. In this case, since it is not always necessary to perform CSI feedback when transmitting HARQ-ACK feedback, a more flexible CSI transmission may be considered.

Request/Trigger of Joint HARQ-ACK and CSI

The terminal can be defined to transmit CSI together with a HARQ-ACK on the (s)PUCCH for transmitting the HARQ-ACK for the scheduled (s)PDSCH. More specifically, Rules can be defined to transmit CSI together on the (s)PUCCH for transmitting the HARQ-ACK for the scheduled DL data channel without a preconfiguration for a period/offset for the CSI feedback or without an aperiodic CSI feedback request by the DL grant control channel. In this case, if the HARQ-ACK including the CSI feedback is transmitted for each DL scheduling even in a case where it is unnecessary, the reliability of reception performance of HARQ-ACK may be reduced. Therefore, rules can be defined for the terminal to include the CSI and transmit the CSI together with the HARQ-ACK when transmitting the HARQ-ACK for the scheduled DL data channel only when a predetermined condition is satisfied. In the present invention, CSI is used as an example for convenience of explanation, however, the idea or the scope of the present invention can be applied to a simultaneous transmission of CSI with an uplink transmission in case of the uplink transmission through RACH procedure (A/N transmission for msg4), or a simultaneous transmission of CSI with the SR transmission in case of a SR transmission, or a simultaneous application for other UL channels such as a SRS.

In a case where a rule is defined for the terminal to include CSI when transmitting a HARQ-ACK for a scheduled DL data channel only when a predetermined condition is satisfied, a detailed proposal for the predetermined condition is as follows:

The rule may be defined to analyze the existing field (or a combination of them) of the DCI and to transmit the HARQ-ACK including the CSI together with the re-analysis of the existing field (or a combination thereof).

When the MCS index of the received DCI is continuously lowered, the terminal transmits the HARQ-ACK including the CSI together when the terminal transmits the HARQ-ACK. Here, a timing window in which the terminal observes the transition of the MCS index may be defined/promised or signaled in advance. Characteristically, the time window may be set independently for each TTI length (group).

Whether the CSI is simultaneously transmitted or not may be determined by a resource allocation field and/or MCS and/or TTI length and/or NDI field (a simultaneous CSI transmission is allowed only at a NDI toggle or only at non-NDI toggle) and/or HARQ process (a simultaneous transmission of CSI feeback is allowed for a predetermined HARQ process). For example, when the coding rate calculated through the resource allocation field, the MCS, and the TTI length is less than a threshold, the CSI is transmitted together with the HARQ-ACK transmission. Here, the threshold for the coding rate may be predefined or signaled. Characteristically, the threshold for the coding rate may be set differently for each modulation order. Alternatively, the threshold for the coding rate may be set differently independently for each TTI length (group).

Rules can be defined to include and transmit CSI together only when transmitting HARQ-ACK for (s)PDSCH scheduled by a specific type of DCI. For example, rules can be defined to include CSI when transmitting a HARQ-ACK for a (s)PDSCH scheduled by a slow/first DCI among two-level DCI, and not to transmit CSI when transmitting a HARQ-ACK for a (s)PDSCH scheduled by a fast/second DCI.

The rule can be defined to include and transmit CSI when transmitting HARQ-ACK for some or all of (s)PDSCHs scheduled by DCI performing multi-TTI scheduling.

If a plurality of (s)PDSCHs are scheduled by the DCI for multi-TTI scheduling, a rule may be defined to transmit CSI along with the HARQ-ACK when transmitting HARQ-ACK for a first, or promised, preconfigured, or signalled (s)PDSCH among the scheduled (s)PDSCHs.

When only one (s)PDSCH is scheduled by the multi-TTI scheduling DCI, the rule can be defined to always transmit only the HARQ-ACK for the (s)PDSCH or transmit the CSI together when transmitting the HARQ-ACK. Or, when scheduling by single-TTI scheduling DCI, it may be fallen back to a simultaneous transmission condition of HARQ-ACK and CSI, and it may be determined whether CSI is simultaneously transmitted or not may be determined by the corresponding condition.

The terminal may be configured with a separate terminal identifier (e.g., RNTI) which allows to transmit CSI together with the HARQ-ACK when transmitting the HARQ-ACK. A rule can be defined to transmit the CSI together when transmitting the HARQ-ACK for the (s)PDSCH scheduled by DCI scrambled with the corresponding RNTI. The terminal identifier may be set differently for each TTI length (group).

The terminal may be explicitly instructed whether or not to include the CSI in the HARQ-ACK transmission together, by the DCI including the DL grant corresponding to the HARQ-ACK transmission. Characteristically, the explicit signal may be directed to the terminal via a specific field to be newly defined in the DCI.

When the NACK is transmitted, CSI is transmitted. If the HARQ-ACK includes HARQ-ACKs for multiple PDSCHs, CSI is transmitted if the ratio of NACK exceeds p % of all HARQ-ACK bits. Or, CSI may be transmitted when a NACK occurs consecutively, or CSI may be transmitted when a NACK occurs at a certain rate or more based on a NACK/ACK ratio stored in the terminal.

CSI may be transmitted when the HARQ-ACK is transmitted in a specific SFN or subframe index.

The CSI transmission period may be configured by the network, andi if the HARQ-ACK is transmitted after the CSI transmission period since the last CSI transmission, the rule can be defined to piggyback the CSI and transmit the CSI together. If there is no HARQ-ACK transmission, CSI transmission may not be performed.

Coding Method

When the CSI is transmitted together with the HARQ-ACK transmission for the DL data channel scheduled to the terminal, detailed schemes for coding HARQ-ACK and CSI are as follows.

Rules can be defined to joint-code HARQ-ACK and CSI and transmit the joint-coded HARQ-ACK and CSI on one UL channel after. Characteristically, a rule can be defined to define priorities between UCIs and to allocate an earlier index to a higher priority UCI. For example, the HARQ-ACK may be allocated to an earlier index than an index of CSI, which can enable that HARQ-ACK is more error robust (in a coding scheme such as RM coding). The rule can be defined so that a lower index of a cell/CSI process to be measured/reported as the UCI is mapped to be allocated to an earlier index.

The rule can be defined to transmit the HARQ-ACK and the CSI separately on (s)PUCCH after separately coding the HARQ-ACK and the CSI.

Whether or not joint/separate coding of the HARQ-ACK and the CSI can be configured through an upper layer (or physical layer) signal.

The HARQ-ACK may be transmitted on sPUCCH and the CSI may be transmitted on sPUSCH or PUSCH considering the case of a terminal capable of a simultaneous transmission of PUSCH/PUCCH or a terminal capable of a simultaneous transmission of long PUSCH/short PUSCH or a terminal capable of supporting a multi-cluster.

PUCCH Resource

When the CSI is transmitted together with the HARQ-ACK transmission for the DL data channel scheduled to the terminal, detailed schemes for determining the resource to transmit the UCI is as follows.

A rule can be defined to define a separate field in the DCI and indicate a PUCCH resource on which the HARQ-ACK and the CSI are transmitted together. For example, an ACK-NACK resource indicator (ARI) field for the PUCCH resource on which the HARQ-ACK and the CSI are transmitted together may be separately defined. When the terminal determines that the condition for transmitting the CSI together with the HARQ-ACK is satisfied, the terminal transmits the HARQ-ACK and the CSI on the PUCCH resource indicated by the ARI instead of a PUCCH resource designated/promised to transmit the HARQ-ACK. If CSI and HARQ-ACK are transmitted on separate channels, a separate ARI field for a PUCCH resource on which the CSI is transmitted may be defined, and the HARQ-ACK may be transmitted on a PUCCH resource defined/indicated according to the legacy LTE standard.

If there is an ARI for the HARQ-ACK in the DCI, the rule can be defined to determine the PUCCH resource by applying a previously defined/promised or signalled offset to a resource associated with the ARI. If the CSI and the HARQ-ACK are transmitted on separate channels, the PUCCH resource for a CSI transmission may be determined by the proposed scheme, and the HARQ-ACK is transmitted on a PUCCH resource defined/indicated according to the legacy LTE standard.

A rule can be defined as follows: A PUCCH resource is configured in advance through a higher layer signal for each CCE (or each CCE group), and the HARQ-ACK and the CSI are transmitted together on the PUCCH resource determined by a starting CCE index of the DCI including the DL grant corresponding to the HARQ-ACK transmission. When the CSI and the HARQ-ACK are transmitted on separate channels, the PUCCH resource for CSI transmission may be determined by the proposed scheme, and the HARQ-ACK is transmitted on a PUCCH resource defined/indicated according to the legacy LTE standard.

A plurality of PUCCH resources can be configured for each CCE (or each CCE group) in advance through a higher layer signal. A rule can be defined such that HARQ-ACK is transmitted in one of the PUCCH resources determined by the starting CCE index of the DCI including the DL grant corresponding to the HARQ-ACK transmission and CSI is transmitted in another of the PUCCH resources. This scheme can be applied only when rules are defined to separately code HARQ-ACK and CSI, respectively.

Resources for A/N+CSI or SR+CSI are separately configured through a higher layer. These resources can be one or more, and one of several resources can be applied using the ARI and the like. This can be considered similar to a similar A/N+SR, and the resources used for A/N may be different when the CSI is transmitted and the CSI is not transmitted.

PUCCH Format

In order to support the operation of transmitting the CSI together with the HARQ-ACK transmission for the DL data channel scheduled to the terminal, the network may configure two or more PUCCH formats to the terminal in advance. Characteristically, one of the PUCCH formats may be a PUCCH format having a compact size container for a HARQ-ACK transmission only, and one of the PUCCH formats may be a PUCCH format having a larger size container for HARQ-ACK+CSI transmission.

The terminal may determine the PUCCH format by considering the total payload size of the UCI and/or the TTI length of the (s)PUCCH among the configured PUCCH formats, and transmit UCI.

CSI Contents

When the CSI is transmitted together with the HARQ-ACK transmission for the DL data channel scheduled to the terminal, detailed schemes for determining corresponding CSI content is as follows.

The reporting mode of the CSI to be transmitted together with the HARQ-ACK may be configured through a physical layer signal or an higher layer signal.

At this time, a reporting mode for the CSI to be transmitted together with the HARQ-ACK may be configured to some or all of RI, PMI, and CQI. For example, it may be configured to wideband CQI only or wideband CQI+RI.

Or, candidates of a reporting mode for the CSI to be transmitted together with the HARQ-ACK may be some (or all) of periodic CSI reporting modes. For example, candidates of a reporting mode for the CSI to be transmitted together with the HARQ-ACK may be limited to a wideband CQI/PMI or RI report and like.

Or, candidates of a reporting mode for the CSI to be transmitted with the HARQ-ACK may be some (or all) of the aperiodic CSI reporting modes.

Depending on a type of DCI, a reporting type of the CSI transmitted with the HARQ-ACK may be promised/defined in advance. For example, the CSI to be transmitted together with the HARQ-ACK for the (s)PDSCH scheduled by the slow/first DCI of the two-level DCI may be defined to higher priority CSI such as CQI and/or RI, and the CSI to be transmitted together with the HARQ-ACK for the (s)PDSCH scheduled by fast/second DCI may be defined to lower priority CSI such as a subband CQI and/or PMI.

When multi-TTI scheduling is supported, the CSI to be transmitted together with the HARQ-ACK transmission for the first or previously promised/configured or signalled (s)PDSCH may be defined to higher priority CSI such as CQI and/or RI, and the CSI to be transmitted together with the HARQ-ACK for other (s)PDSCH may be defined to lower priority CSI such as a subband CQI and/or PMI and the like.

Values of the CSI to be transmitted together with the HARQ-ACK may be determined as a form of an offset of a specific CSI report. For example, values of the CSI to be transmitted together with the HARQ-ACK for (s)PDSCH scheduled by fast/second DCI may be determined as an offset of the CSI to be transmitted with the HARQ-ACK for (s)PDSCH scheduled with slow/first DCI. As another example, values of the CSI to be transmitted together with the HARQ-ACK may be determined as an offset value for the value of the periodic/aperiodic CSI report transmitted previously.

If a multi-TTI scheduling is supported, values of the CSI to be transmitted together with the HARQ-ACK for the (s)PDSCH other than the (s)PDSCH, which is the first or previously promised/configured or signalled, may be determined as an offset for a value of the CSI to be transmitted together with the HARQ-ACK for the (s)PDSCH, which is the first or previously promised/configured or signalled.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Figure 6:
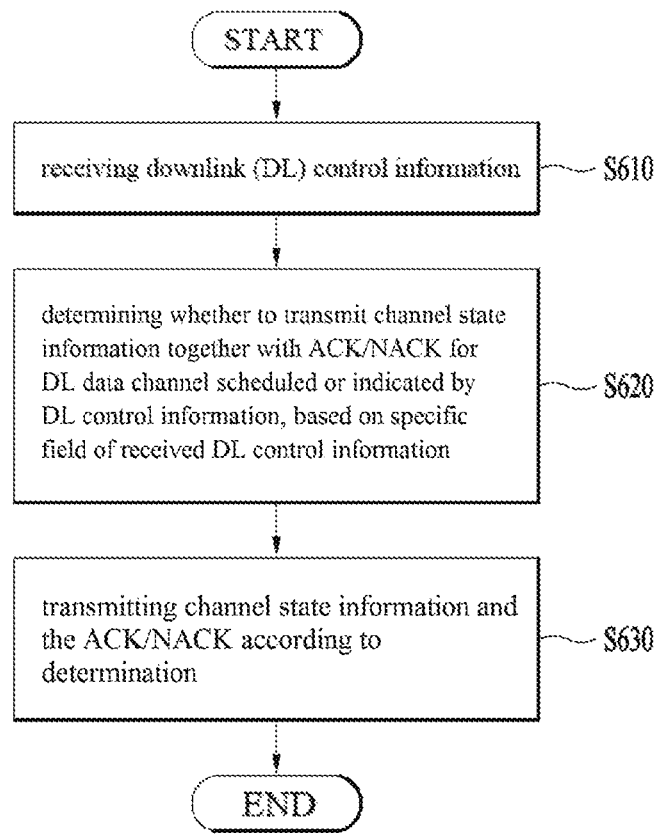
FIG. 6 illustrates an operation of a terminal.

FIG. 6 illustrates an operation of a UE according to embodiments of the present invention. FIG. 6 is a flowchart for a method of transmitting uplink control information for a terminal configured to support one or more TTI (transmission time interval) lengths.

The terminal may receives downlink (DL) control information (S610). The DL control information may include a DL grant, that is, information for scheduling or indicating a DL data channel. Further, the DL control information may include information for scheduling or indicating DL data channels in one or more TTIs, and to schedule or indicate DL data channels in multiple TTIs may be referred to multi-TTI scheduling.

The terminal may determine whether to transmit channel state information together with an acknowledgement/negative acknowledgement (ACK/NACK) for a DL data channel scheduled or indicated by the DL control information, based on a specific field of the received DL control information (S620).

The terminal may transmit the channel state information and the ACK/NACK according to the determination (S630).

The specific field may include a modulation and coding scheme (MCS) field, and when an index of the MCS field of the received DL control information is lower than an index of an MCS field of previously received DL control information, both the channel state information and the ACK/NACK may be determined to be transmitted.

Also, the specific field may include at least one of a resource allocation field, a modulation and coding scheme (MCS) field, a new data indicator (NDI) field, and a hybrid automatic repeat request (HARQ) process number field, and the determination of whether to transmit the channel state information together with the ACK/NACK may be based on the TTI lengths in addition to the specific field.

When a coding rate calculated based on the specific field and the TTI lengths is less than a threshold value, both the channel state information and ACK/NACK may be determined to be transmitted.

The threshold value may be independently configured for each index of the MCS field, each of the TTI lengths, or each TTI length group.

Also, a physical uplink control channel (PUCCH) on which the channel state information and the ACK/NACK are to be transmitted together may be indicated by a second field of the received DL control information.

A physical uplink control channel (PUCCH) on which the channel state information and the ACK/NACK are to be transmitted together may be indicated by a value obtained by adding a predefined offset to a value of a third field of the received DL control information.

Or, a physical uplink control channel (PUCCH) on which the channel state information and the ACK/NACK are to be transmitted together may be determined as one of a plurality of PUCCH resources configured through higher layer signaling.

The channel state information to be transmitted together with the ACK/NACK may be determined based on a channel state information reporting mode configured for the terminal or a type of the received DL control information.

The channel state information to be transmitted together with the ACK/NACK may be determined as an offset value for other channel state information.

When the received DL control information schedules DL data channels in a plurality of TTIs, channel state information to be transmitted together with an ACK/NACK for a first DL data channel or a predetermined DL data channel of the DL data channels may include channel state information of a relatively high priority, and channel state information to be transmitted together with an ACK/NACK for DL data channels, other than the first DL data channel or the predetermined DL data channel of the DL data channels, may include channel state information of a relatively low priority.

The channel state information to be transmitted together with the ACK/NACK for DL data channels, other than the first DL data channel or the predetermined DL data channel of the DL data channels may be determined as an offset value for the channel state information to be transmitted together with the ACK/NACK for the first DL data channel or the predetermined DL data channel of the DL data channels.

In the foregoing description, embodiments of the present invention have been briefly explained with reference to FIG. 6. An embodiment related to FIG. 6 can alternatively or additionally include at least a part of the aforementioned embodiments.

Figure 7:
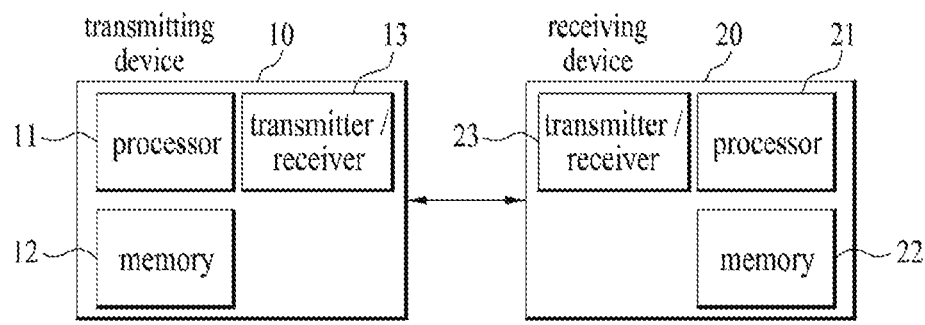
FIG. 7 is a block diagram of a device for implementing embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or the receiving device may be configured as a combination of one or more embodiments of the present invention.

It will be apparent to those skilled in the art that various modifications and variations can be made in the present invention without departing from the scope of the invention. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method for transmitting uplink control information for a terminal configured to support at least one cell having one or more transmission time interval (TTI) lengths in a wireless communication system, the method being performed by the terminal and comprising:

receiving downlink (DL) control information;
determining whether to transmit channel state information together with an acknowledgement/negative acknowledgement (ACK/NACK) for a DL data channel scheduled by the DL control information, based on whether an index of a modulation and coding scheme (MCS) field of the received DL control information is lower than an index of an MCS field of previously received DL control information; and transmitting the channel state information together with the ACK/NACK based on the determination that the index of the MCS field of the received DL control information is lower than the index of the MCS field of the previously received DL control information.

2. The method of claim 1, wherein
wherein the determination of whether to transmit the channel state information together with the ACK/NACK is based on the TTI lengths in addition to the MCS field.

3. The method of claim 2, wherein when a coding rate calculated based on the MCS field and the TTI lengths is less than a threshold value, both the channel state information and the ACK/NACK are determined to be transmitted.

4. The method of claim 3, wherein the threshold value is independently configured for each index of the MCS field, each of the TTI lengths, or each TTI length group.

5. The method of claim 1, wherein a physical uplink control channel (PUCCH) on which the channel state information and the ACK/NACK are to be transmitted together is indicated by a second field of the received DL control information.

6. The method of claim 1, wherein a physical uplink control channel (PUCCH) on which the channel state information and the ACK/NACK are to be transmitted together is indicated by a value obtained by adding a predefined offset to a value of a third field of the received DL control information.

7. The method of claim 1, wherein a physical uplink control channel (PUCCH) on which the channel state information and the ACK/NACK are to be transmitted together is determined as one of a plurality of PUCCH resources configured through higher layer signaling.

8. The method of claim 1, wherein the channel state information to be transmitted together with the ACK/NACK is determined based on a channel state information reporting mode configured for the terminal or a type of the received DL control information.

9. The method of claim 1, wherein the channel state information to be transmitted together with the ACK/NACK is determined as an offset value for other channel state information.

10. The method of claim 1, wherein
when the received DL control information schedules DL data channels in a plurality of TTIs,
channel state information to be transmitted together with an ACK/NACK for a first DL data channel includes channel state information of a relatively high priority, and
channel state information to be transmitted together with an ACK/NACK for DL data channels, other than the first DL data channel, includes channel state information of a relatively low priority.

11. The method of claim 10, wherein the channel state information to be transmitted together with the ACK/NACK for DL data channels, other than the first DL data channel, is determined as an offset value for the channel state information to be transmitted together with the ACK/NACK for the first DL data channel.

12. A terminal configured to support at least one cell having one or more transmission time interval (TTI) lengths in a wireless communication system, the terminal comprising:
a transmitted and a receiver; and
a processor that controls the transmitter and the receiver, wherein the processor:
receives downlink (DL) control information,
determines whether to transmit channel state information together with an acknowledgement/negative acknowledgement (ACK/NACK) for a DL data channel scheduled by the DL control information, based on whether an index of a modulation and coding scheme (MCS) field of the received DL control information is lower than an index of an MCS field of previously received DL control information, and
transmits the channel state information together with the ACK/NACK based on the determination that the index of the MCS field of the received DL control information is lower than the index of the MCS field of the previously received DL control information.

* * * * *